United States Patent [19]

Edl et al.

[11] 4,425,105

[45] Jan. 10, 1984

[54] ARRANGEMENT FOR PROTECTING A BELT

[75] Inventors: Josef Edl; Georg Petz, both of Griesheim; Rudolf Kling, Darmstadt, all of Fed. Rep. of Germany

[73] Assignee: Quick-Rotan Elektromotoren GmbH, Darmstadt, Fed. Rep. of Germany

[21] Appl. No.: 162,039

[22] Filed: Jun. 20, 1980

[30] Foreign Application Priority Data

Jun. 25, 1979 [DE] Fed. Rep. of Germany ....... 2925605
Sep. 21, 1979 [DE] Fed. Rep. of Germany ....... 2838253

[51] Int. Cl.³ .......................... F16H 7/18; B62J 13/00
[52] U.S. Cl. ..................................... 474/140; 474/146
[58] Field of Search ................. 74/608, 609, 612, 613, 74/614, 566; 474/144, 100, 111, 140, 151, 146; 112/217.3, 261; 30/382

[56] References Cited

U.S. PATENT DOCUMENTS

| 1,232,953 | 7/1917 | Mills | 74/609 |
| 1,575,088 | 3/1926 | Bartlett | 74/613 |
| 2,015,770 | 10/1935 | Vedder | 74/609 |
| 2,355,272 | 8/1944 | Cardwell | 474/146 |
| 2,638,944 | 5/1953 | Woleslagle | 30/382 X |
| 2,718,153 | 9/1955 | Dean | 474/140 |
| 3,885,471 | 5/1975 | Morine et al. | 474/144 |
| 4,063,358 | 12/1977 | Hodge | 30/382 |

FOREIGN PATENT DOCUMENTS

| 121519 | 7/1901 | Fed. Rep. of Germany | 474/151 |
| 237411 | 7/1925 | Fed. Rep. of Germany | . |
| 467533 | 10/1928 | Fed. Rep. of Germany | 474/144 |
| 52-54865 | 5/1977 | Japan | 474/144 |
| 52505 | 4/1942 | Netherlands | 474/144 |
| 24006 | of 1895 | United Kingdom | 474/144 |
| 118782 | 9/1918 | United Kingdom | 74/609 |
| 131777 | 9/1919 | United Kingdom | 74/613 |
| 237411 | 7/1925 | United Kingdom | 74/614 |
| 256369 | 8/1926 | United Kingdom | . |
| 547053 | 8/1942 | United Kingdom | 74/612 |
| 591660 | 8/1947 | United Kingdom | 474/144 |
| 866224 | 4/1961 | United Kingdom | . |
| 2051999 | 1/1981 | United Kingdom | 474/144 |

*Primary Examiner*—Lawrence J. Staab
*Attorney, Agent, or Firm*—Michael J. Striker

[57] ABSTRACT

An arrangement for protecting a belt has a cover element arranged to at least partially surround a belt pulley, and a hood element arranged on the cover element and adjustable relative to the other in direction normal to the axis of the belt pulley. The hood element may be telescopically displaceable over the cover element and fixable to the same. The hood element may also be formed as a bellows with an adjustable length.

3 Claims, 20 Drawing Figures

ARRANGEMENT FOR PROTECTING A BELT

BACKGROUND OF THE INVENTION

The present invention relates to a shield arrangement for a belt. More particularly, it relates to an arrangement for shielding a belt of a drive in which power is transmitted via the belt and which has a cover member at least partially surrounding a belt pulley at the driven side of the drive.

Belt shielding arrangements of the above-mentioned general type are known in the art. Motors equipped with such a belt shielding arrangement are mounted at a lower side of the table, for example a table of a sewing machine. The same motor can be provided for different types of the machines, or to the contrary, identical machines can be equipped with different motors. As a result of this, changes in the distance between the axis of the belt pulley and the lower side of the table within a certain range frequently take place in the practice. Cover members of different sizes must be available in order to prevent interference with the sides of the V-belt running on the pulley.

SUMMARY OF THE INVENTION

Accordingly, it is an object of the present invention to provide a shield arrangement for a belt, which avoids the disadvantages of the prior art.

More particularly, it is an object of the present invention to provide a shield arrangement for a belt, which is simple and reliable to mount, convenient to adjust, and provides for improved protection against injuries.

In keeping with these objects and with others which will become apparent hereinafter, one feature of the present invention resides, briefly stated, in an arrangement which has a power element arranged to at least partially surround a belt pulley, wherein a hood element is provided, arranged on the cover element and adjustable relative to the latter in direction normal to the axis of the belt pulley.

When the arrangement is designed in accordance with the present invention, it eliminates the abovementioned disadvantages. The adjustable hood element provides for simple matching of the shield arrangement to the belts of different lengths. The hood element can be adjusted relative to the cover element, so that no space remains at the running side of the belt between the belt protection and the table carrying the drive motor, so that no accidental engagement could take place.

In accordance with another advantageous feature of the present invention, the hood element is telescopically displaceable over the cover element and fixable relative to the latter. In another embodiment of the present invention, the hood element may be formed as a bellows which has a length adjustable in direction normal to the axis of the belt pulley.

In accordance with still another feature of the present invention, the cover element is adjustable relative to the belt pulley in the direction of adjustment of the hood element. This makes it possible to utilize the end wall of the cover element, spaced from the hood element, as means to prevent the belt from falling off and to adjust the same in dependence upon the different diameters of the belt pulley. It is thereby guaranteed that the drive belt will not fall off the belt pulley during tension release of the belt.

An especially simple construction is provided when the cover element is displaceably carried on a bent off portion of a clamping ring which is clamped at the driving side of the drive. In order to provide a minimum number of structural parts for the shield arrangement, it is advantageous to have the bent off part of the clamping ring extend through alignable slots provided in the cover element and in the hood element, and a clamping member is arranged for releasably fixing the cover element against the belt pulley and the hood element against the cover element.

In accordance with yet another feature of the present invention, an upper end of the hood element may be provided with belt inlet protecting means which is operative for excluding accidents in the event of the motor being freely suspended.

Instead of forming the cover element as an adjustable means for preventing falling off of the belt, the cover member can be provided with additional adjustable belt falling off preventing means arranged inside the cover element and adjustable as to its radial distance from the axis of the belt pulley. In such a case, it is advantageous when the belt falling off preventing means is connected with a guiding member arranged at the lower side of the cover and extending outwardly of the same. The guiding member is adjustable relative to the cover element and fixable to the latter by arresting means. The function of the guiding member is that when the belt falling off preventing means is accidentally disconnected from the cover element, it cannot drop downward as an individual part and pull along with the belt in this situation. The belt falling off preventing means can be easily adjusted.

In accordance with a further feature of the prevent invention, the guiding member may be formed as a swinging arm which is supported by a clamping ear of the cover element for rotation about a pivot axis parallel to the axis of the belt pulley. The belt falling off preventing means is advantageously constituted of a metal strip which extends inside the cover element substantially in the circumferential direction of the belt pulley and has an end portion connected with the swinging arm, and more particularly with the inwardly extending end portion of the latter.

In order to further simplify the manipulation, the cover element in accordance with still a further advantageous feature of the present invention, may be provided with adjustment facilitating means arranged in the region of the belt falling off preventing means and formed as an elongated opening. The elongated opening advantageously extends in the region of the free end of the belt falling off preventing means, spaced from the swinging arm, and in the radial direction of the belt pulley.

In accordance with a different embodiment of the present invention, a pin can be utilized as a guiding member, which is longitudinally displaceable in a guiding ear of the cover element and carries the belt falling off protecting means at its end portion extending into the interior of the cover element. Advantageously, the pin extends in the radial direction of the belt pulley, and is arrested by a clamping screw which is screwed into a threaded hole of the guiding ear.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
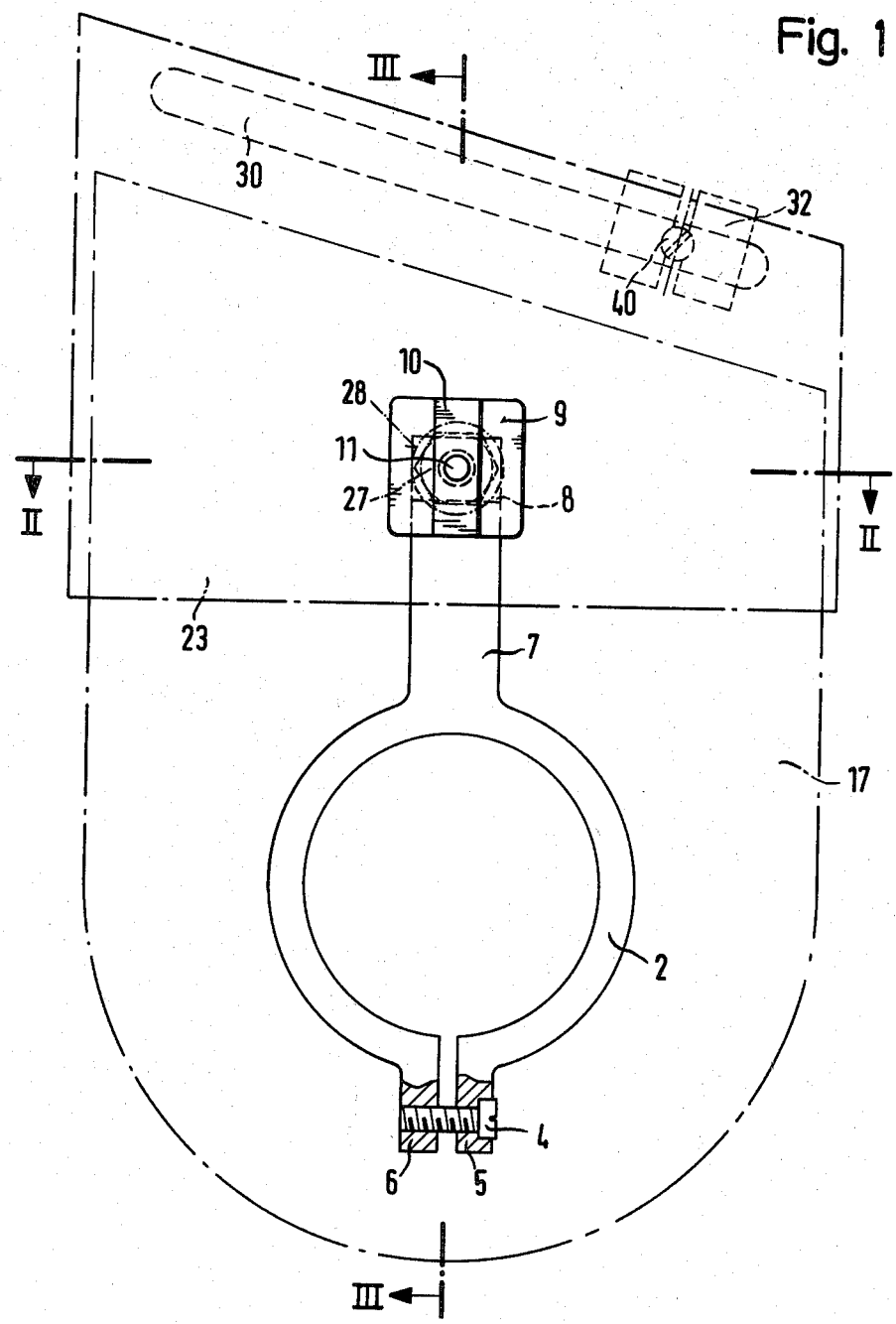
FIG. 1 is a view showing a shield arrangement for a belt at the side facing toward the motor.

A driving motor, for example, for driving a sewing machine, is not shown in the drawing. The only part of the drive motor which is shown in the drawing is a bearing element 1 arranged in a housing of the drive motor. A clamping ring 2 is mounted on the bearing element 1. A screw 4 engages in a hole of a tongue 5 of the clamping ring and is screwed in a threaded hole of an opposite tongue 6 of the same.

An arm 7 extends upwardly from the side of the clamping ring 2, which is opposite to the tongue 5 and 6. The arm 7 merges into a perpendicularly bent off portion 8. The bent off portion 8 has a free end with a cross-section which enlarges as a truncated pyramid so as to form a contact face 9. The guiding projection 10 extends from the contact face 9 parallel to the arm 7. A threaded hole 11 extends from the contact face 9 into the bent off portion 8.

Figure 2:
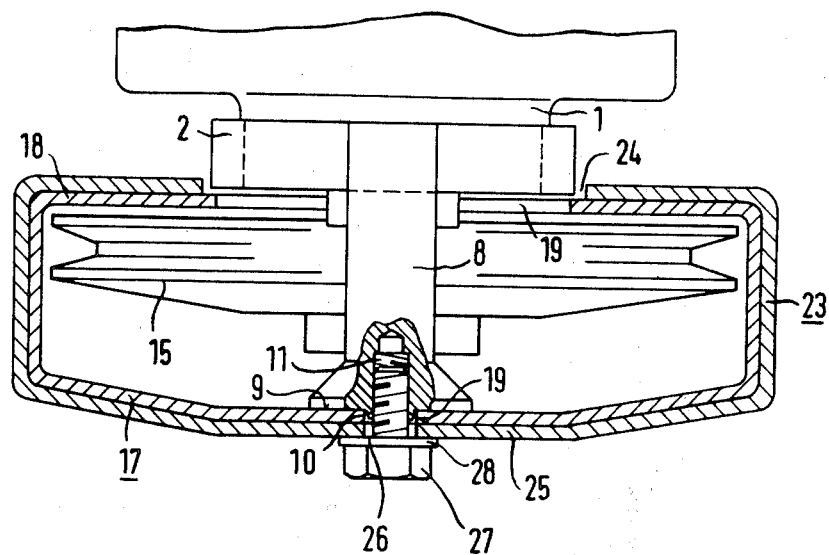
FIG. 2 is a view showing a section taken along the line II—II of FIG. 1.
Figure 3:
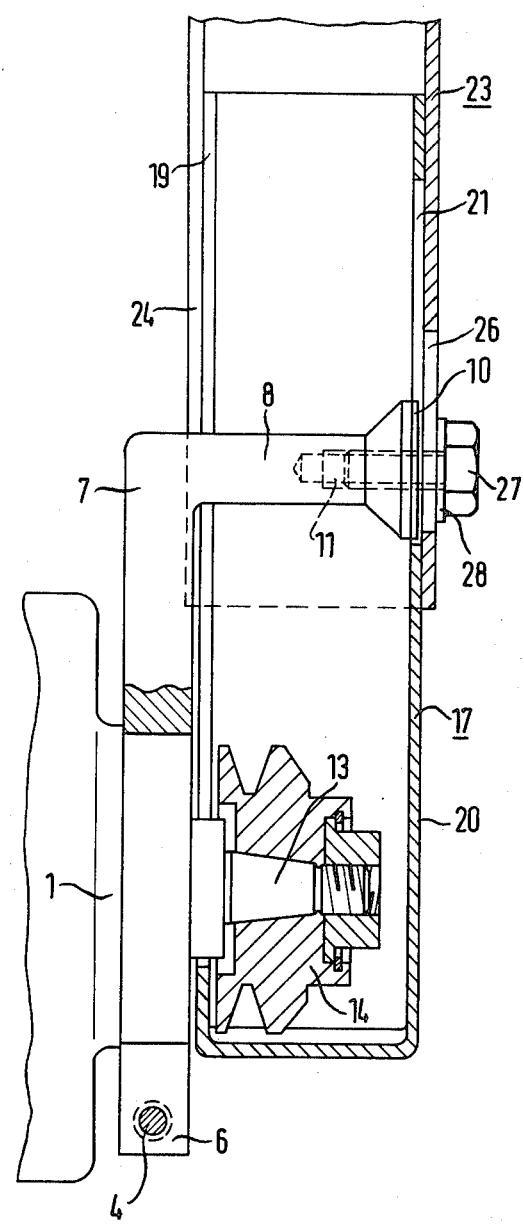
FIG. 3 is a view showing a section taken along the line III—III of FIG. 1.
Figure 4:
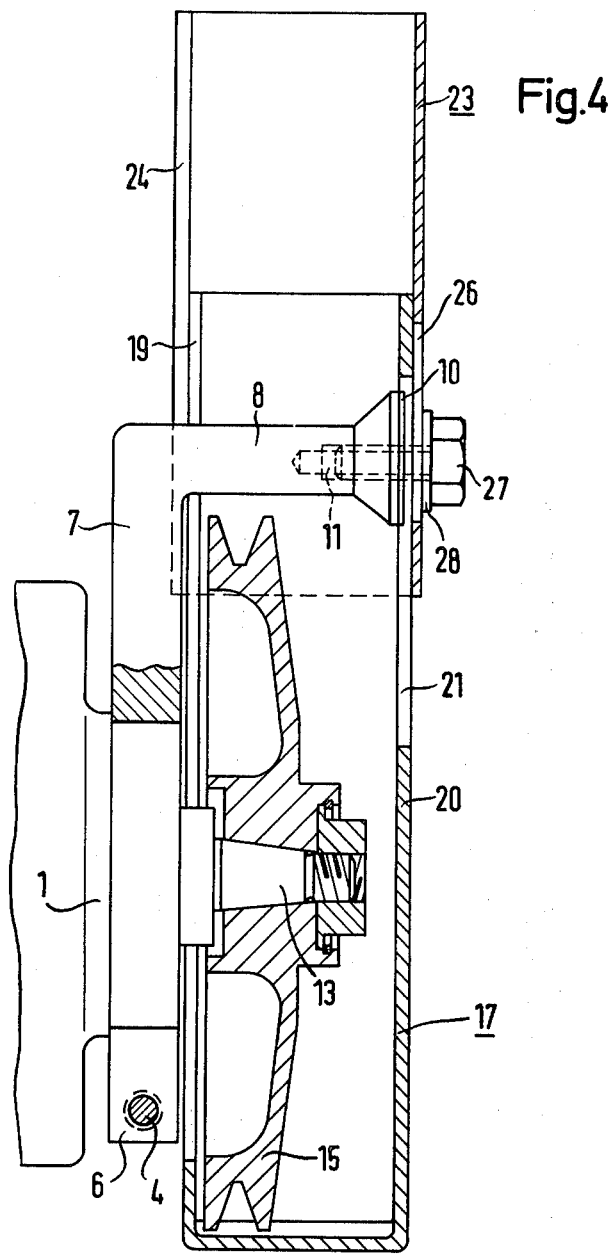
FIG. 4 is a view showing a section taken along the line III—III of FIG. 1 for a greater belt pulley.
Figure 5:
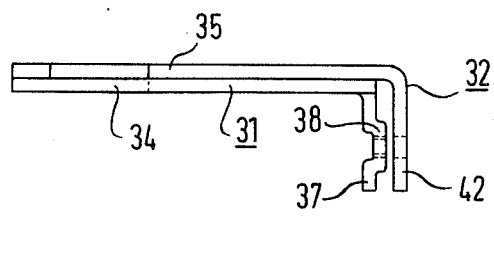
FIG. 5 is a side view of the shield arrangement for a belt in accordance with the present invention.
Figure 7:
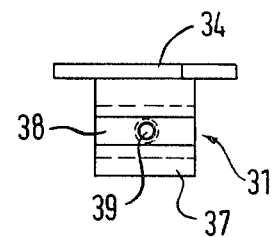
FIGS. 7, 8 and 9 are front, side and plan views of several structural parts of the shield arrangement for a belt.
Figure 6:
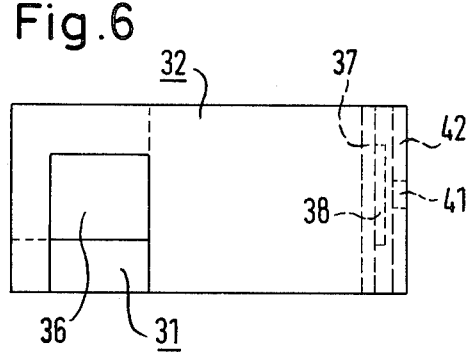
FIG. 6 is a plan view of the shield arrangement for a belt shown in FIG. 5.
Figure 8:
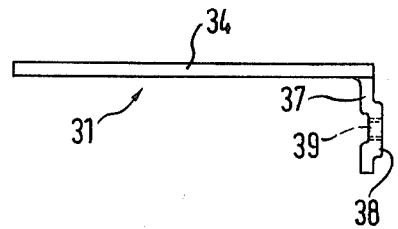
Figure 9:
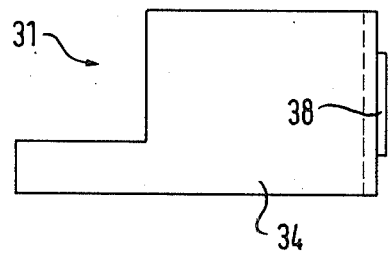

Belt pulleys of different diameters can be mounted on a driven shaft 13 of the drive motor. The smallest belt pulley 14 is shown in FIG. 3, whereas the largest belt pulley 15 is shown in FIGS. 2 and 4.

The belt pulley is embraced by a cover element formed as a cup-shaped shell 17. The shell 7 has an upwardly open elongated slot 19 in a rear wall 18 facing toward the drive motor. It also has an elongated slot 21 at its front wall 20.

The elongated slot 21 has a width which is insignificantly greater than the width of the guiding projection 10. The bent-off portion 8 which is parallel to the driven shaft 13, engages in the elongated slot 19. The front wall 20 of the shell 17 abut against the contact face 9. The guiding projection 10 extends into the elongated slot 21.

A hood element 23 is arranged on the shell 17. The hood element 23 is telescopically displaceable over the shell 17 in direction almost to the driven shaft 13. The hood element 23 has a throughgoing elongated slot 24 in its rear wall and an elongated slot 26 in its front wall 25. The bent off portion 8 extends through the elongated slot 24, whereas a screw 27 extends through the elongated slot 26 and is screwed in the threaded hole 11. The head of the screw 27 abuts against the front wall 25 of the hood element 23 with interposition of a washer 28. When the screw 27 is tightened, the front wall 25 of the hood element 23 is pressed against the front wall 20 of the shell 17, which in turn is pressed against the contact face 9.

For mounting of the illustrated shield arrangement for a belt, the shell 17, in condition of the loose screw 27, is installed in the manner shown in FIGS. 3 and 4, so far on the respective one of the pulleys 14 or 15 that the pulley does not slide on the shell 17, but falling off of the belt from the groove of the belt pulley is prevented when the tension of the belt is released, which takes place, for example, when a sewing machine driven by the belt is turned by 90° from its working position for servicing purposes. In this position of the shell 17, the hood element 23 is displaced to the lower side of a table which carries the drive motor, for example, a sewing table. Then, the shell 17 and the hood element 23 are fixed by tightening of the screw 27 relative to the clamping ring 2 and the bent off portion 8. Since the shell 17 and the hood element 23 allow stepless adjustment, falling off of the belt from the belt pulley is prevented, on the one hand. On the other hand, engagement in the belt in the region between the shell 17 and the lower side of the table is reliably prevented.

Figure 10:
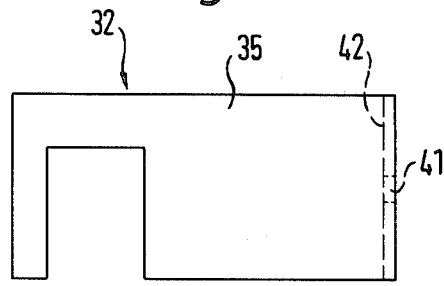
FIGS. 10 and 11 are plan and front views of the other structural parts of the shield arrangement for a belt.
Figure 11:
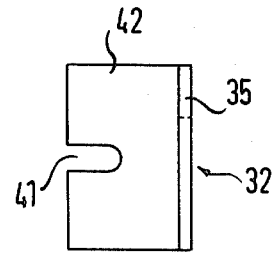
Figure 12:
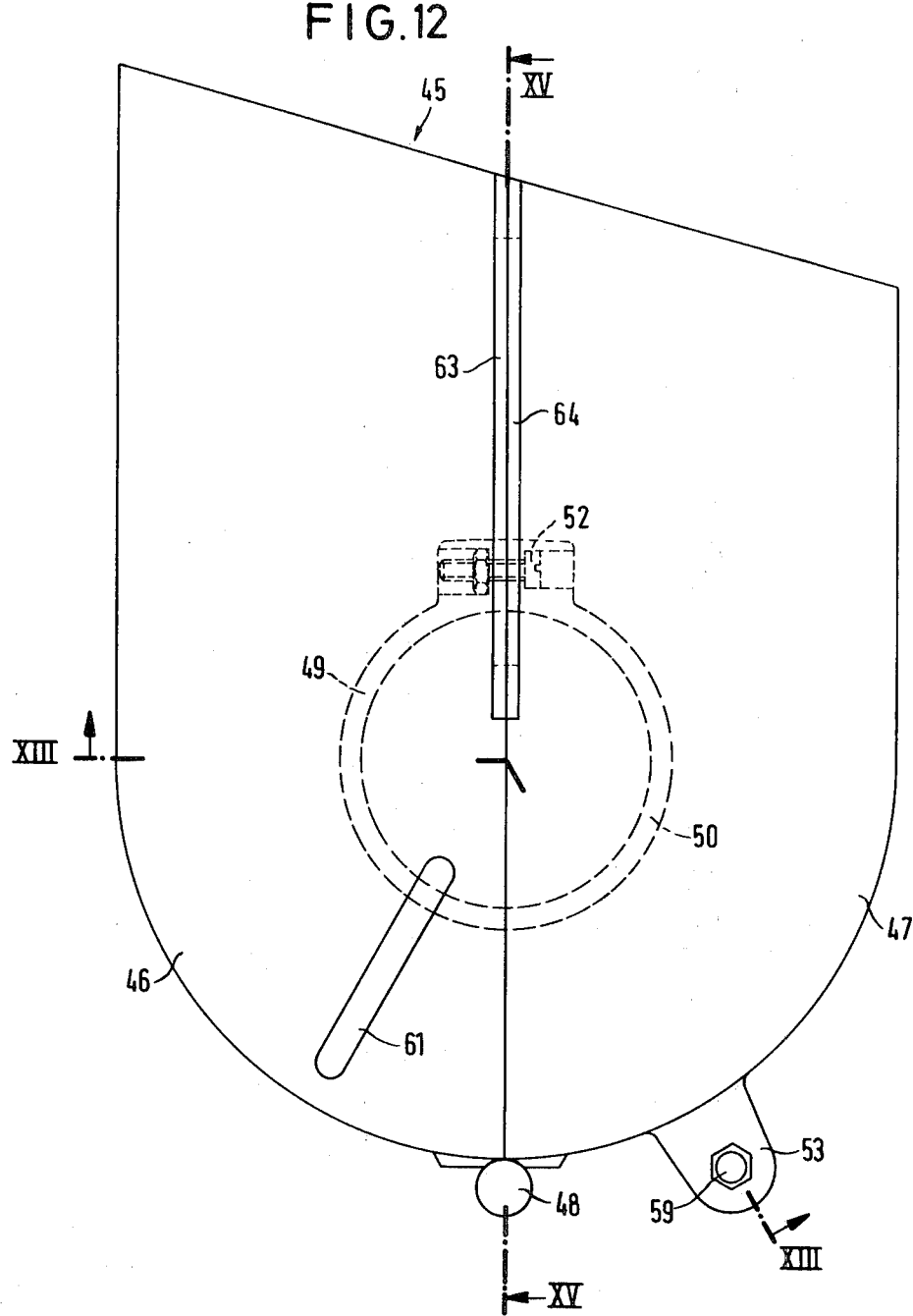
FIG. 12 is a side view of a cover element of the arrangement in accordance with another embodiment of the present invention.
Figure 13:
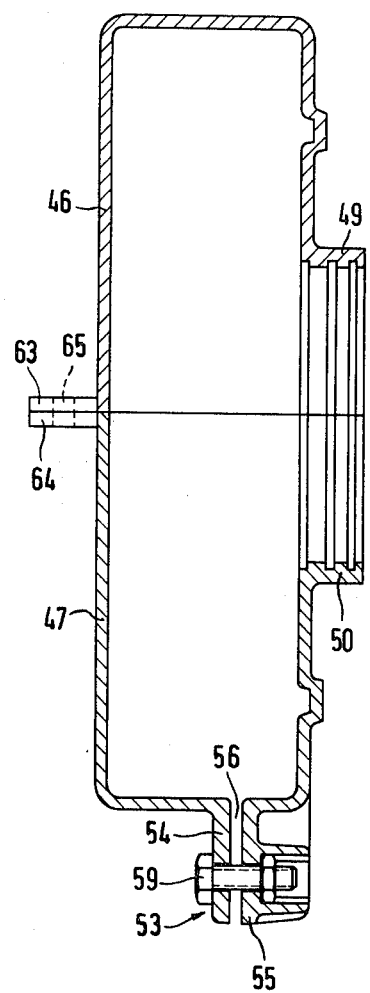
FIG. 13 is a view showing a section of the cover element, taken along the line XIII—XIII of FIG. 12.
Figure 14:
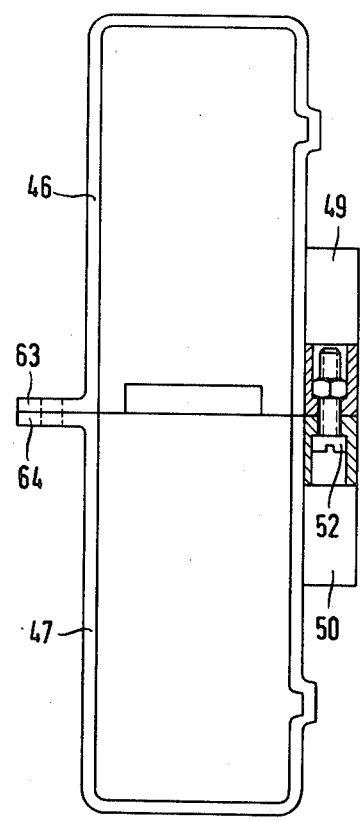
FIG. 14 is a partially sectioned plan view of the cover.
Figure 15:
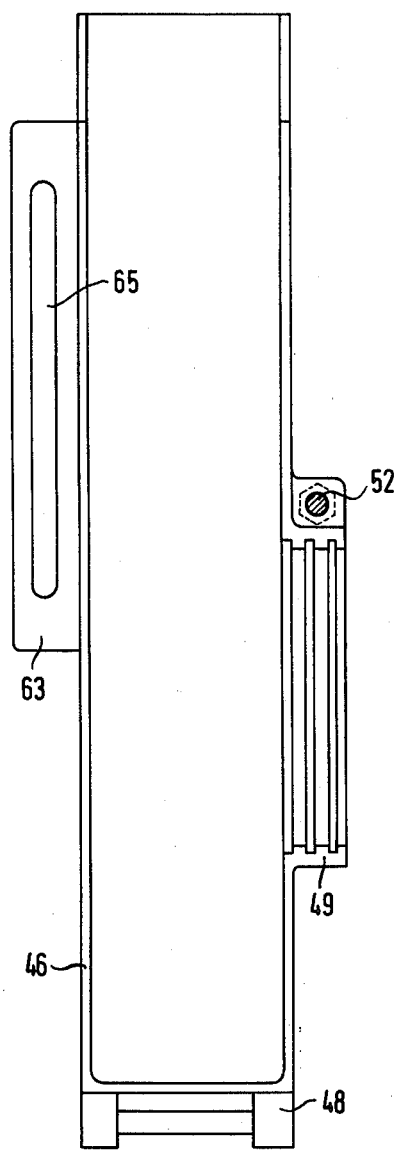
FIG. 15 is a view of a shell of the cover element, corresponding to the line XV—XV of FIG. 12.
Figure 16:
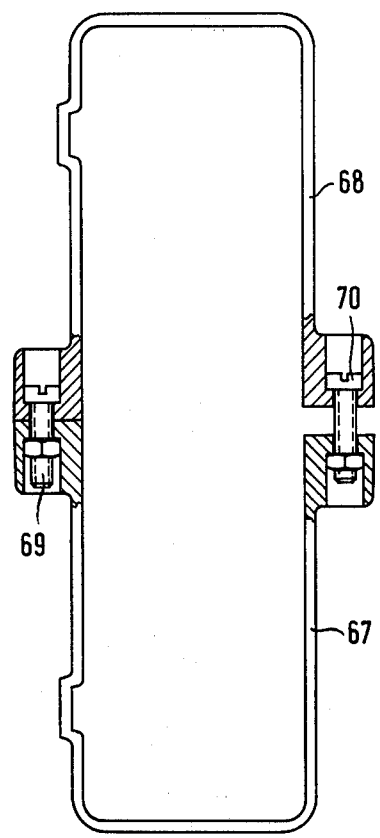
FIG. 16 is a partially sectioned plan view of a hood element.
Figure 17:
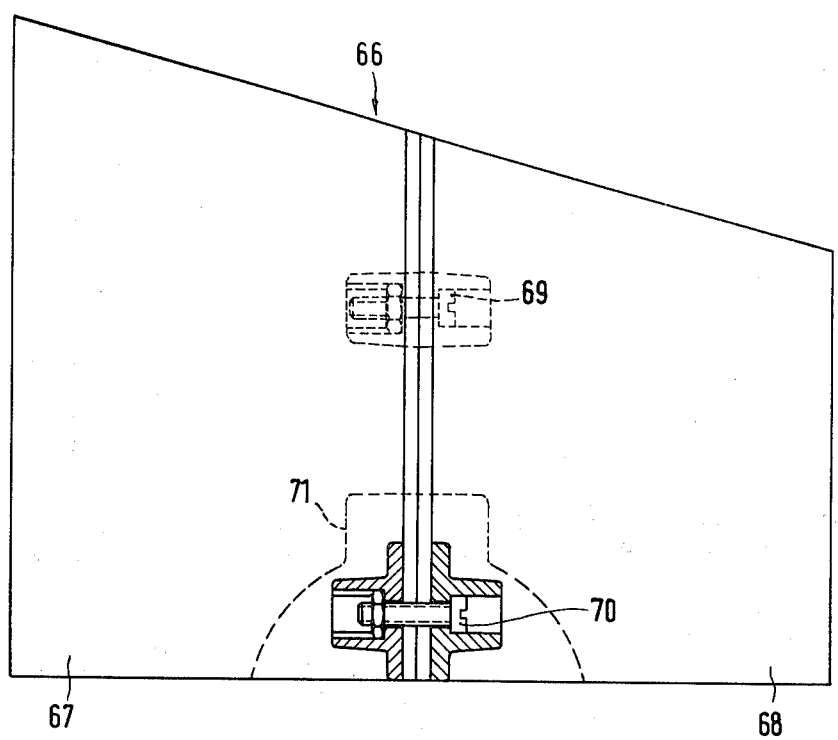
FIG. 17 is a partially sectioned side view of the hood element.
Figure 18:
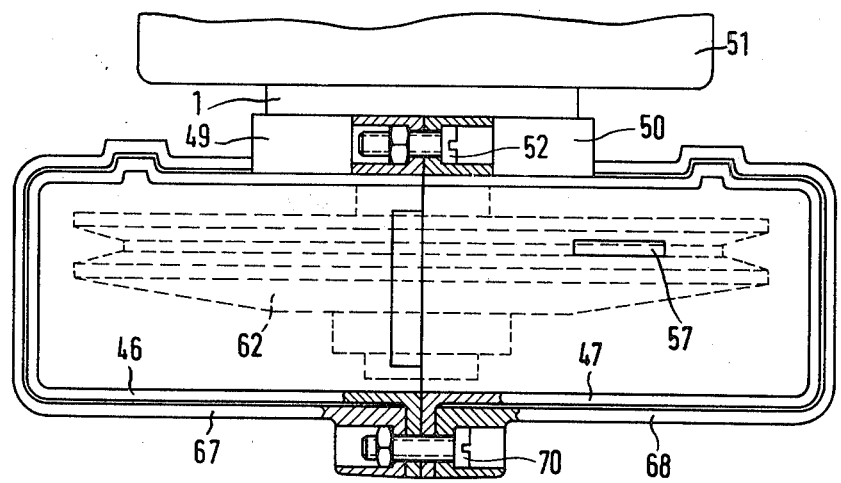
FIG. 18 is a partially sectioned plan view of the shield arrangement for a belt, composed of the cover element and the hood element.
Figure 19:
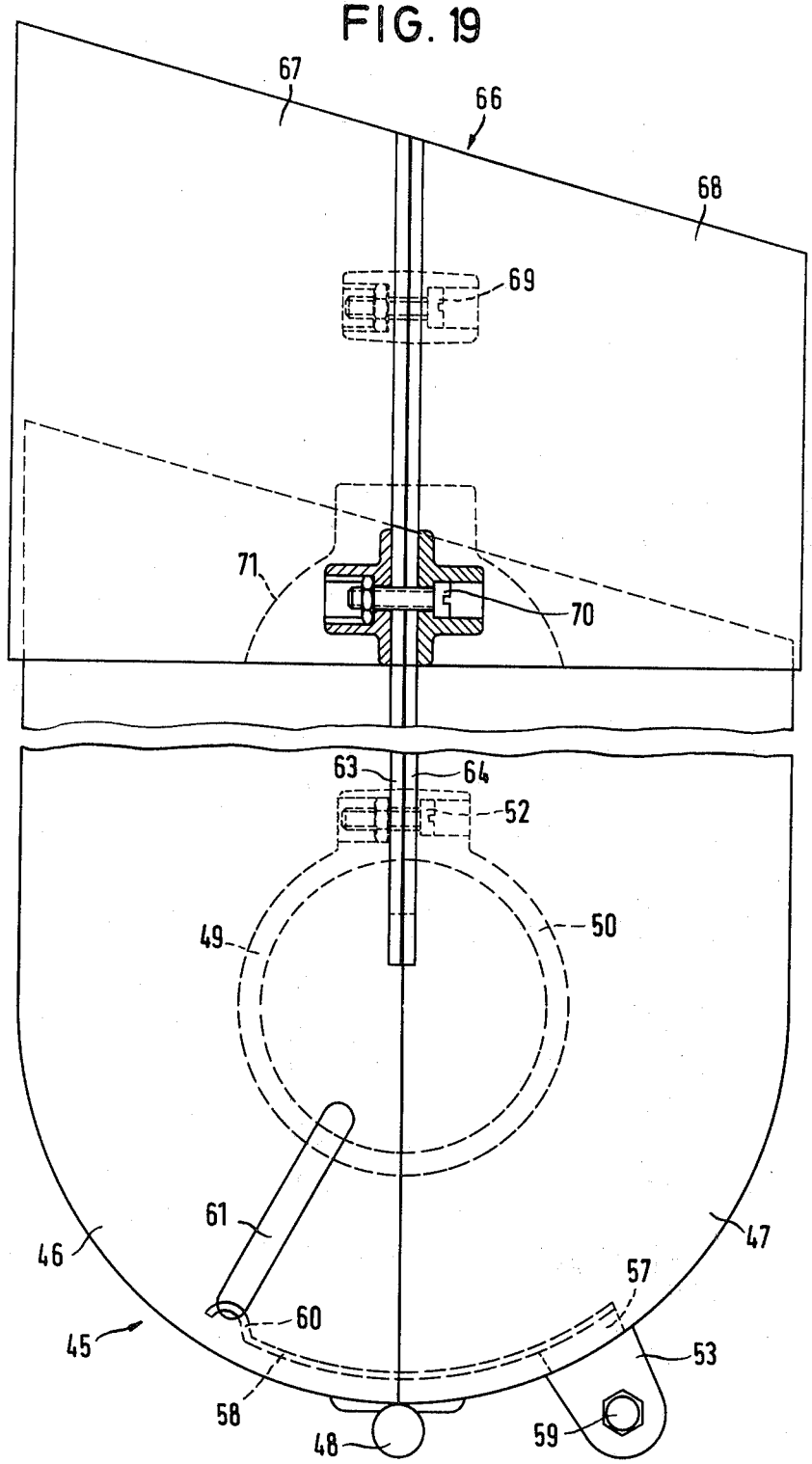
FIG. 19 is a partially sectioned side view of the entire shield arrangement for a belt.

When the motor is not mounted below a table or the like, but, for example, is freely suspended, belt inlet protecting means shown in FIGS. 5-11 is provided. This means is adjustably guided in an elongated slot 30 at the free end of the hood element 23 in dependence upon the diameter of the respective belt pulley. The belt inlet protecting means is composed of an inner angle member 31 (FIGS. 7, 8 and 9) and an outer angle member 32 (FIGS. 10 and 11). Long arms 34 and 35 of the same together limit an inlet opening 36 (FIG. 6) for the belt. Short arm 37 of the inner angle member 31 is bent off so as to form a guiding projection 38 engaging in the longitudinal slots 30 of the hood element 23, and is provided with a threaded hole 39.

A screw 40 (FIG. 1) engages through a slot 41 of the short arm 42 of the outer angle member 32 and the elongated slot 30 of the hood element 23, into the threaded hole 39. Thereby the outer angle member 32 is pressed against the outer side and the inner angle member 31 is pressed against the inner side of the hood wall in the region of the elongated slot 30.

In accordance with another embodiment of the present invention illustrated in FIGS. 12-19, a cover element 45 is composed of two half shells 46 and 47 having a substantially U-shaped cross-section. The half shells 46 and 47 are connected at their lower end by a hinge 48. The half shells 46 and 47 are provided at their rear side with axially outwardly projecting flanges 49 and 50 formed as half rings. The half rings are fitted on the supporting portion 1 (FIG. 18) of a motor 51 and mounted thereon by a clamping screw 52. The half shell 47 has in its lower region a radially extending clamping ear 53. Parts 54 and 55 of the clamping ear 53 are spaced from one another so as to form a slot 56. A swinging arm 57 (FIG. 19) of a belt falling-off preventing element 58 extends substantially radially into the slot 56. The swinging arm 57 is pivotally mounted on a clamping screw 59 and can be fixed in desired angular position relative to the clamping ear 53 by tightening of the clamping screw.

The falling off preventing element 58 is composed of a metal strip extending substantially in circumferential direction of the belt pulley and having an end connected with the swinging arm 57 at the portion of the latter extending inwardly of the cover element 45. In the illustrated embodiment, the swinging arm 57 and the falling-off preventing element 58 are integrally connected with one another. The metal strip 58 forming the falling-off preventing element is bent off substantially normal to the swinging arm 57. An end portion 60 of the falling-off preventing element, which is spaced from the swinging arm 57 is U-shaped and extends outwardly through an elongated opening 61 of the half shell 46.

The elongated opening 61 extends in radial direction of the belt pulley and serves as means for facilitating the adjustment. The end portion 60 of the falling-off preventing element 58 can be engaged by a suitable tool (beam, screwdriver and the like) through the elongated hole 61. Thereby, the end portion 60, for the purpose of adjustment of the falling-off preventing element in condition of the released clamping screw 59, can be displaced so far to the diameter of the respective belt pulley 52 (FIG. 18) that the V-shaped belt cannot exit out of the pulley groove when the tension of the V-shaped belt is released.

Front sides of the half shells 46 and 47 are provided at their facing end sides with projections 63 and 64 which extend normal forwardly and have an elongated slot 65. A hood element identified in total by reference numeral 66 is fitted on the upper end of the cover element 45. The hood element 66 is composed of two half shells 67 and 68 having a substantially U-shaped cross-section. The half shells 67 and 68 are connected at the rear side by a clamping screw 69 and at the front side by a clamping screw 70.

The clamping screw 70 extends through the elongated hole 65. This allows the hood 66 to be displaced telescopically in the region determined by the elongated opening 65, in direction toward the axis of the belt pulley 62 relative to the cover element 45. The hood element 66 can be fixed by tightening of the clamping screws 69 and 70 in the desired position relative to the cover element 45. The hood element 66 can thereby abut against the lower side of a table or the like. The hood shells 67 and 68 are cut out at their rear sides in correspondence with the shape of the flanges 49 and 50.

Figure 20:
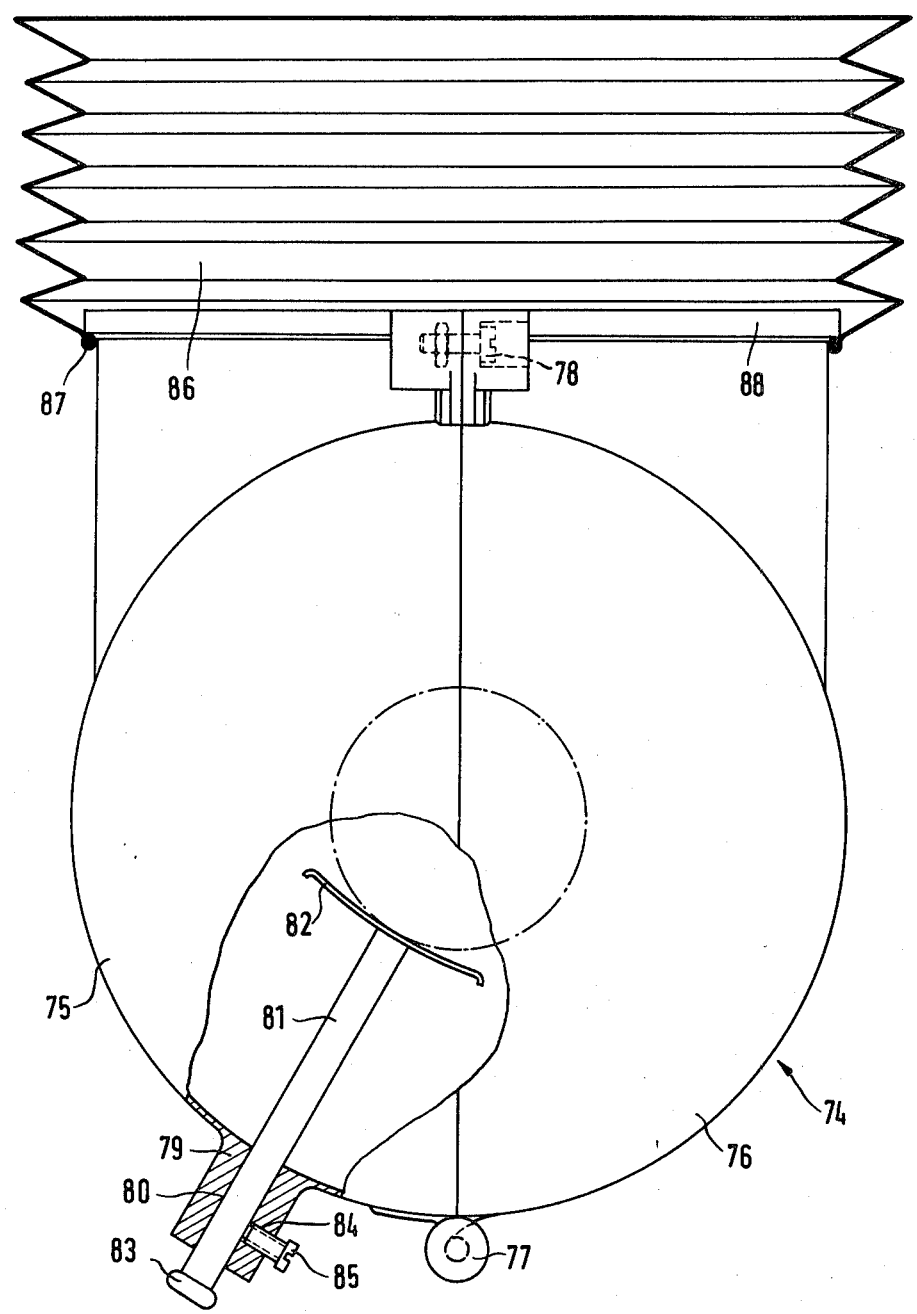
FIG. 20 is a partially sectioned side view of a shield arrangement for a belt, in accordance with a further embodiment of the present invention.

In accordance with a further embodiment of the present invention shown in FIG. 20, a cover element 74 is again provided, composed of two half shells 75 and 76. The half shells 75 and 76 are connected with one another by a hinge 77 at their lower end and fixed to one another by a clamping screw 78 at their upper end. The half shell 75 is provided with a guiding ear 79 at its lower side, the guiding ear 79 projecting radially outwardly of the half shell 75. The guiding ear 79 has a radial guiding opening 80 for a pin 81. The pin 81 carries a belt falling-off preventing element 82. The latter is arranged at the end of the element 82, extending inwardly of the half shell 75. The falling-off preventing element 82 is formed as a metal strip.

A projection 83 is provided at the opposite end of the pin 81 extending through the guiding opening 80. The projection 83 prevents dropping of the pin 81 into the cover element 74. The threaded hole 84 is further formed in the guiding ear 79 and extends normal to the guiding opening 80. A clamping screw 85 is screwed into the threaded hole 84 so as to arrest the pin 81.

A bellows 86 is arranged at the upper end of the cover element 74. The bellows 86 form a longitudinally adjustable hood and abuts with its lower end 87 against an outwardly projecting flange 88 of the shells 75 and 76.

Similarly to the hood 66, the bellows 86 allows to overlap different distances between the upper end of the cover element 74 and the lower side of a table or the like, so as to prevent engagement in the belt.

It will be understood that each of the elements described above or two or more together, may also find a useful application in other types of constructions differing from the types described above.

While the invention has been illustrated and described as embodied in an arrangement for protecting a belt, it is not intended to be limited to the details shown, since various modifications and structural changes may be made without departing in any way from the spirit of the present invention.

Without further analysis, the foregoing will so fully reveal the gist of the present invention that, others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A shield arrangement for a power transmitting belt of a drive including a belt pulley having an axis and arranged at a driven side of the drive, the arrangement comprising a cover element arranged to at least partially surround said belt pulley, said cover element having a lower portion and including a pair of half shells having a substantially U-shaped cross section and interconnected by a hinge, mounting means attached to said cover element for mounting said cover element in fixed relation to said axis, a hood element arranged on said cover element and adjustable relative to the latter in a direction normal to the axis of the belt pulley, and a belt falling off preventing means comprising a strip-shaped member having first and second ends and extending in the interior of said cover element substantially in the circumferential direction of the belt pulley, said first end being connected to a swinging arm which is supported at the lower portion of said cover element for rotation about an axis parallel to the axis of the belt pulley and which is adapted to be fixed in a selected rotary position relative to said cover element, to thereby allow adjustment of said second end in a substantially radial direction with respect to the axis of the belt pulley for accommodating various pulley sizes.

2. An arrangement as defined in claim 1, wherein said swinging arm is supported in a clamping ear of said cover element and has an end section extending into the interior of said cover element for connection with said strip-shaped member.

3. An arrangement as defined in claim 1, wherein said cover element is provided with an elongated opening extending in the region of said second end in the radial direction of the belt for facilitating adjustment of said belt falling off preventing means.

* * * * *